US009288434B2

(12) United States Patent
Bangolae et al.

(10) Patent No.: US 9,288,434 B2
(45) Date of Patent: Mar. 15, 2016

(54) APPARATUS AND METHOD FOR CONGESTION CONTROL IN WIRELESS COMMUNICATION NETWORKS

(71) Applicant: Intel IP Corporation, Santa Clara, CA (US)

(72) Inventors: Sangeetha L. Bangolae, Beaverton, OR (US); Marta Martinez Tarradell, Hillsboro, OR (US); Ana Lucia Pinheiro, Hillsboro, OR (US); Puneet Jain, Hillsboro, OR (US); Chang Hong Shan, Shanghai (CN); Hyung-Nam Choi, Hamburg (DE)

(73) Assignee: Intel IP Corporation, Santa Clara, CA (US)

( * ) Notice: Subject to any disclaimer, the term of this patent is extended or adjusted under 35 U.S.C. 154(b) by 119 days.

(21) Appl. No.: 14/141,985

(22) Filed: Dec. 27, 2013

(65) Prior Publication Data
US 2014/0321272 A1  Oct. 30, 2014

Related U.S. Application Data

(60) Provisional application No. 61/816,662, filed on Apr. 26, 2013.

(51) Int. Cl.
*H04W 28/02* (2009.01)
*H04N 7/14* (2006.01)
(Continued)

(52) U.S. Cl.
CPC .............. *H04N 7/141* (2013.01); *H04L 5/0032* (2013.01); *H04L 65/1006* (2013.01); *H04L 65/1016* (2013.01); *H04L 65/1069* (2013.01); *H04L 65/1073* (2013.01); *H04L 65/602* (2013.01); *H04L 65/608* (2013.01); *H04L 65/80* (2013.01); *H04W 8/005* (2013.01);
(Continued)

(58) Field of Classification Search
None
See application file for complete search history.

(56) References Cited

U.S. PATENT DOCUMENTS 5,331,413 A  7/1994  Diner
5,617,422 A  4/1997  Litzenberger et al.
(Continued)

FOREIGN PATENT DOCUMENTS

KR    20080067273 A    7/2008
KR    1020090006281 A  1/2009
(Continued)

OTHER PUBLICATIONS

"U.S. Appl. No. 14/107,400, Non Final Office Action mailed May 27, 2015", 21 pgs.
(Continued)

*Primary Examiner* — Vincelas Louis
(74) *Attorney, Agent, or Firm* — Schwegman Lundberg & Woessner, P.A.

(57) ABSTRACT

Embodiments of wireless communication devices and method for congestion control in a wireless network are generally described herein. Some of these embodiments describe a method, performed by an evolved NodeB (eNodeB), that includes operations of determining that a congestion condition exists on the network. An example method can also include transmitting a suspension notification to a user equipment (UE), the UE being in an RRC_CONNECTED state with the eNodeB, to notify the UE that a radio bearer (RB) operating in the network will be suspended. Other methods and apparatuses are also described.

16 Claims, 5 Drawing Sheets

(51) Int. Cl.
| | |
|---|---|
| *H04W 72/04* | (2009.01) |
| *H04W 52/02* | (2009.01) |
| *H04W 76/04* | (2009.01) |
| *H04W 8/00* | (2009.01) |
| *H04L 5/00* | (2006.01) |
| *H04W 88/02* | (2009.01) |
| *H04W 36/00* | (2009.01) |
| *H04W 60/00* | (2009.01) |
| *H04L 29/06* | (2006.01) |
| *H04L 12/801* | (2013.01) |
| *H04W 76/06* | (2009.01) |
| *H04W 48/06* | (2009.01) |
| *H04W 76/02* | (2009.01) |

(52) U.S. Cl.
CPC ..... *H04W 28/0289* (2013.01); *H04W 36/0066* (2013.01); *H04W 52/0212* (2013.01); *H04W 60/00* (2013.01); *H04W 72/0486* (2013.01); *H04W 76/048* (2013.01); *H04W 88/02* (2013.01); *H04L 47/10* (2013.01); *H04W 48/06* (2013.01); *H04W 76/027* (2013.01); *H04W 76/068* (2013.01)

(56) References Cited

U.S. PATENT DOCUMENTS

| | | | |
|---|---|---|---|
| 5,686,957 | A | 11/1997 | Baker |
| 6,104,721 | A | 8/2000 | Hsu |
| 7,724,972 | B2 | 5/2010 | Wang et al. |
| 8,019,175 | B2 | 9/2011 | Lee et al. |
| 8,358,613 | B1 | 1/2013 | Giallorenzi et al. |
| 8,570,359 | B2 | 10/2013 | Ali et al. |
| 8,711,198 | B2 | 4/2014 | Malzbender et al. |
| 8,830,892 | B2 | 9/2014 | Chung et al. |
| 8,922,718 | B2 | 12/2014 | House et al. |
| 8,970,653 | B2 | 3/2015 | Bowen et al. |
| 8,977,063 | B2 | 3/2015 | Lee et al. |
| 2004/0192211 | A1 | 9/2004 | Gallagher et al. |
| 2005/0202823 | A1 | 9/2005 | Shaheen et al. |
| 2008/0096566 | A1 | 4/2008 | Brunner et al. |
| 2009/0040955 | A1 | 2/2009 | Jung et al. |
| 2009/0147685 | A1 | 6/2009 | Malhotra et al. |
| 2009/0210766 | A1 | 8/2009 | Katayama et al. |
| 2009/0280802 | A1 | 11/2009 | Chin et al. |
| 2010/0026781 | A1 | 2/2010 | Ali et al. |
| 2010/0067433 | A1 | 3/2010 | Cheng et al. |
| 2010/0074182 | A1 | 3/2010 | Shao |
| 2010/0081391 | A1 | 4/2010 | Suzuki et al. |
| 2010/0118111 | A1 | 5/2010 | Bouazizi |
| 2010/0130237 | A1 | 5/2010 | Kitazoe et al. |
| 2010/0202561 | A1 | 8/2010 | Gorokhov et al. |
| 2010/0208607 | A1 | 8/2010 | Chin et al. |
| 2010/0220652 | A1 | 9/2010 | Ishii et al. |
| 2010/0238805 | A1 | 9/2010 | Ludwig et al. |
| 2010/0317394 | A1 | 12/2010 | Harris et al. |
| 2011/0019633 | A1* | 1/2011 | Tajima et al. ............... 370/329 |
| 2011/0161441 | A1 | 6/2011 | Haruna et al. |
| 2011/0195710 | A1 | 8/2011 | Nas et al. |
| 2011/0217980 | A1 | 9/2011 | Faurie et al. |
| 2011/0217985 | A1 | 9/2011 | Gorokhov |
| 2011/0235706 | A1 | 9/2011 | Demircin et al. |
| 2011/0242975 | A1 | 10/2011 | Zhao et al. |
| 2011/0250888 | A1 | 10/2011 | Ryu et al. |
| 2011/0258313 | A1 | 10/2011 | Mallik et al. |
| 2011/0263255 | A1 | 10/2011 | Alonso-rubio et al. |
| 2012/0008574 | A1 | 1/2012 | Xiao et al. |
| 2012/0087396 | A1 | 4/2012 | Nimbalker et al. |
| 2012/0176884 | A1 | 7/2012 | Zhang et al. |
| 2012/0281621 | A1 | 11/2012 | Lotfallah et al. |
| 2012/0287881 | A1 | 11/2012 | Arnott et al. |
| 2012/0307794 | A1 | 12/2012 | Shaheen et al. |
| 2012/0320141 | A1 | 12/2012 | Bowen et al. |
| 2013/0039180 | A1 | 2/2013 | Hong et al. |
| 2013/0039339 | A1* | 2/2013 | Rayavarapu et al. ......... 370/331 |
| 2013/0040671 | A1 | 2/2013 | Zawaideh et al. |
| 2013/0044697 | A1 | 2/2013 | Yoo et al. |
| 2013/0045707 | A1 | 2/2013 | Lee et al. |
| 2013/0051277 | A1 | 2/2013 | Hakola et al. |
| 2013/0101036 | A1 | 4/2013 | Zhou |
| 2013/0170415 | A1 | 7/2013 | Fukuta et al. |
| 2013/0195074 | A1 | 8/2013 | Keller et al. |
| 2013/0201824 | A1* | 8/2013 | Venkatachalam ..... H04W 28/12 370/230 |
| 2013/0258919 | A1 | 10/2013 | Damnjanovic |
| 2013/0301501 | A1 | 11/2013 | Olvera-Hernandez et al. |
| 2014/0176663 | A1 | 6/2014 | Cutler et al. |
| 2014/0219088 | A1 | 8/2014 | Oyman et al. |
| 2014/0225918 | A1 | 8/2014 | Mittal et al. |
| 2014/0286215 | A1 | 9/2014 | Koc et al. |
| 2014/0295864 | A1 | 10/2014 | Gunnarsson et al. |
| 2014/0320587 | A1 | 10/2014 | Oyman |
| 2014/0321272 | A1* | 10/2014 | Bangolae ......... H04W 36/0066 370/230 |
| 2014/0321343 | A1 | 10/2014 | Gupta et al. |
| 2014/0321360 | A1 | 10/2014 | Han et al. |
| 2014/0321369 | A1 | 10/2014 | Davydov et al. |
| 2014/0323128 | A1 | 10/2014 | Zaus et al. |
| 2014/0323133 | A1 | 10/2014 | Yeh et al. |
| 2014/0325078 | A1 | 10/2014 | Shan et al. |
| 2015/0195490 | A1 | 7/2015 | Oyman et al. |

FOREIGN PATENT DOCUMENTS

| | | |
|---|---|---|
| KR | 20100054015 A | 5/2010 |
| KR | 1020110051787 A | 5/2011 |
| KR | 1020110102935 A | 9/2011 |
| KR | 1020120099805 A | 9/2012 |
| TW | 201446026 A | 12/2014 |
| TW | 201501498 A | 1/2015 |
| TW | 201507374 A | 2/2015 |
| WO | WO-2007053851 A2 | 5/2007 |
| WO | WO-2012065658 A1 | 5/2012 |
| WO | WO-2013025040 A2 | 2/2013 |
| WO | WO-2014160765 A1 | 10/2014 |
| WO | WO-2014176058 A1 | 10/2014 |
| WO | WO-2014176087 A1 | 10/2014 |
| WO | WO-2014176089 A1 | 10/2014 |
| WO | WO-2014176106 A1 | 10/2014 |
| WO | WO-2014176200 A1 | 10/2014 |
| WO | WO-2014176245 A1 | 10/2014 |
| WO | WO-2014176480 A1 | 10/2014 |

OTHER PUBLICATIONS

"U.S. Appl. No. 14/109,121, Non Final Office Action mailed Apr. 29, 2015", 6 pgs.

"U.S. Appl. No. 14/132,525, Non Final Office Action mailed May 7, 2015", 15 pgs.

"Control Signaling to Support for Enhanced DL MIMO", R1-104021, 3GPP TSG RAN WG1 Meeting #61bis, (2010), 6 pgs.

"Discussion on scenarios for evaluation of interference cancellation and suppression schemes", R1-130927, 3GPP TSG-RAN WG1 #72bis, (2013), 3 pgs.

"International Application Serial No. PCT/US2014/031845, International Search Report mailed Aug. 26, 2014", 3 pgs.

"International Application Serial No. PCT/US2014/031845, Written Opinion mailed Aug. 26, 2014", 4 pgs.

"International Application Serial No. PCT/US2014/033965, International Search Report mailed Aug. 7, 2014", 3 pgs.

"International Application Serial No. PCT/US2014/033965, Written Opinion mailed Aug. 7, 2014", 5 pgs.

"International Application Serial No. PCT/US2014/034307, International Search Report mailed Aug. 11, 2014", 3 pgs.

"International Application Serial No. PCT/US2014/034307, Written Opinion mailed Aug. 11, 2014", 5 pgs.

"International Application Serial No. PCT/US2014/034337, International Search Report mailed Aug. 8, 2014", 3 pgs.

"International Application Serial No. PCT/US2014/034337, Written Opinion mailed Aug. 8, 2014", 6 pgs.

(56) References Cited

OTHER PUBLICATIONS

"International Application Serial No. PCT/US2014/034480, International Search Report mailed Aug. 26, 2014", 3 pgs.
"International Application Serial No. PCT/US2014/034480, Written Opinion mailed Aug. 26, 2014", 4 pgs.
"International Application Serial No. PCT/US2014/034879, International Search Report mailed Aug. 28, 2014", 3 pgs.
"International Application Serial No. PCT/US2014/034879, Written Opinion mailed Aug. 28, 2014", 8 pgs.
"International Application Serial No. PCT/US2014/034966, International Search Report mailed Aug. 22, 2014", 3 pgs.
"International Application Serial No. PCT/US2014/034966, Written Opinion mailed Aug. 22, 2014", 5 pgs.
"International Application Serial No. PCT/US2014/035409, International Search Report mailed Aug. 26, 2014", 4 pgs.
"International Application Serial No. PCT/US2014/035409, Written Opinion mailed Aug. 26, 2014", 6 pgs.
"Taiwanese Application Serial No. 103113875, Amendment filed Oct. 16, 2014", English Translation, 2 pgs.
"Views on the use of DM RS ports / scrambling sequences for MU-MIMO", R1-103830, 3GPP TSG-RAN WG1 Meeting #61bis, (2010), 6 pgs.
Suckchel, Yang, "An Adaptive Discontinuous Reception Mechanism Based on Extended Paging Indicator for Power Saving in UMTS", In: Vehicular Technology Conference, VTC-2006 Fall. IEEE 64th, [Online]. Retrieved from the Internet: <http://i.eexplore.ieee.org/stamp/stamp.jsparnumber=4109444>, (2006), 5 pgs.
"U.S. Appl. No. 14/107,400, Response filed Aug. 26, 2015 to Non Final Office Action mailed May 27, 2015", 10 pgs.
"3rd Generation Partnership Project; Technical Specification Group Radio Access Network; Evolved Universal Terrestrial Radio Access (E-UTRA); Physical layer procedures (Release 11)", 3GPP TS 36.213 V11.4.0, (Sep. 2013), 182.
"U.S. Appl. No. 14/109,121, Non Final Office Action mailed Aug. 14, 2015", 8 pgs.
"U.S. Appl. No. 14/109/121, Response filed Jul. 28, 2015 to Non Final Office Action mailed Apr. 29, 2015", 10 pgs.
"U.S. Appl. No. 14/132,525, Examiner Interview Summary mailed May 28, 2015", 3 pgs.
"U.S. Appl. No. 14/132,525, Response filed Aug. 7, 2015 to Non Final Office Action mailed May 7, 2015", 14 pgs.
"U.S. Appl. No. 14/132,974, Non Final Office Action mailed Jul. 10, 2015", 8 pgs.
"U.S. Appl. No. 14/135,265, Non Final Office Action mailed Jul. 29, 2015", 11 pgs.
"U.S. Appl. No. 14/140,823, Non Final Office Action mailed Aug. 5, 2015", 6 pgs.
"U.S. Appl. No. 14/140,823, Preliminary Amendment filed Mar. 26, 2014", 3 pgs.
"U.S. Appl. No. 14/141,034, Preliminary Amendment filed Dec. 26, 2014", 7 pgs.

\* cited by examiner

… (1)

APPARATUS AND METHOD FOR CONGESTION CONTROL IN WIRELESS COMMUNICATION NETWORKS

PRIORITY APPLICATION

This application claims priority to U.S. Provisional Application Ser. No. 61/816,662, filed Apr. 26, 2013, which is incorporated herein by reference in their entirety.

TECHNICAL FIELD

Embodiments pertain to wireless communications. Some embodiments relate to radio access network (RAN) congestion.

BACKGROUND

With the proliferation of the number of smartphone and machine-type communication (MTC) devices, network congestion has increased. This congestion can cause degradation in quality of service.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
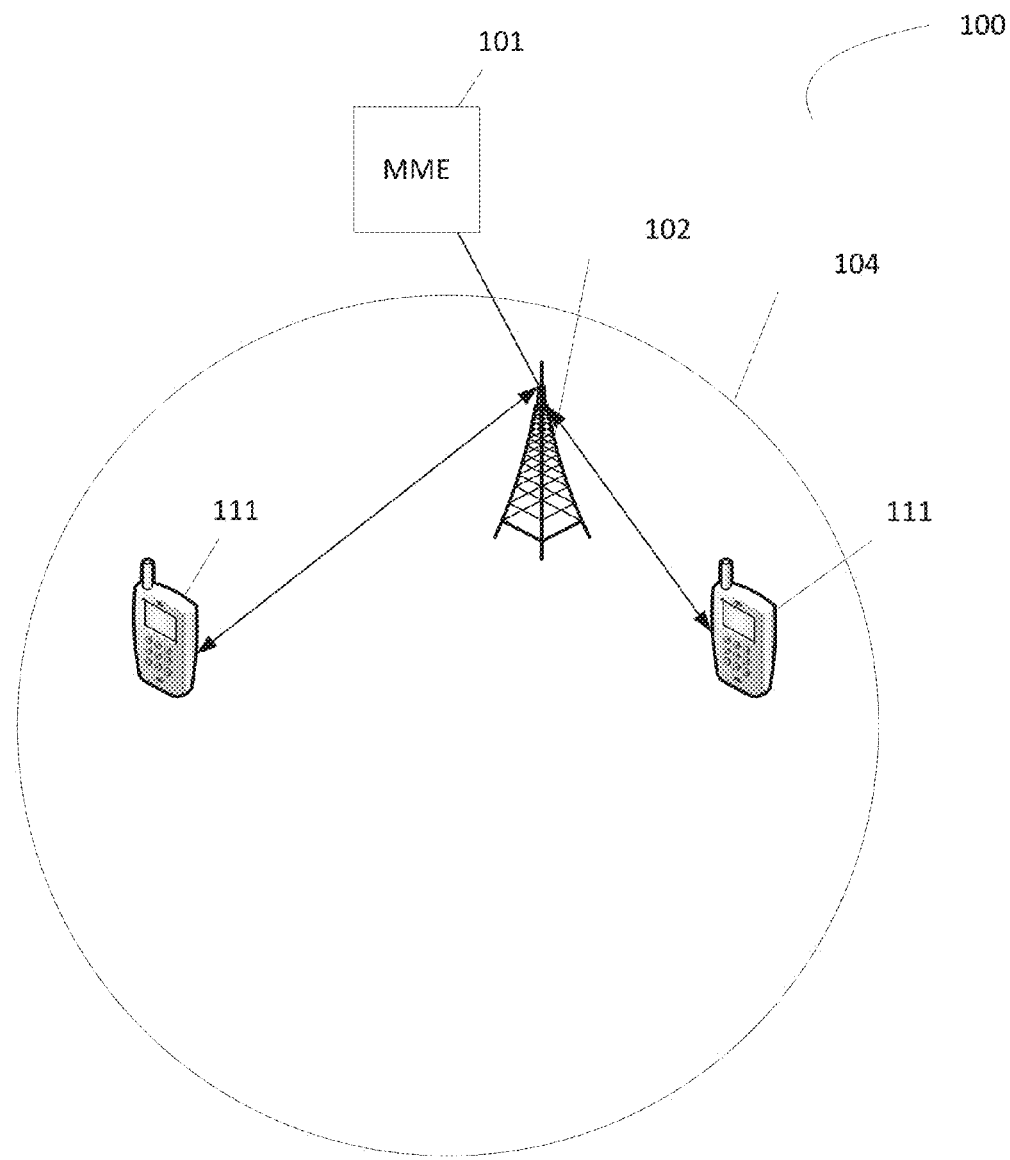
FIG. 1 shows a wireless communication network according to some embodiments described herein.

FIG. 1 shows a wireless communication network 100, according to some embodiments described herein. Wireless communication network 100 may include a mobile management entity (MME) 101, a base station, such as an evolved Node-B (eNodeB) 102, and user equipment (UEs) 111. ENodeB 102 and UEs 111 may operate to wirelessly communicate with each other in wireless communication network 100.

An example of wireless communication network 100 includes an evolved universal terrestrial radio access network (EUTRAN) using 3GPP LTE standards operating in time division duplex (TDD) mode. Another example of wireless communication network 100 includes a EUTRAN using 3GPP-LTE standards operating in frequency division duplex (FDD) mode. Further examples of wireless communication network 100 include a UTRAN using 3GPP-UMTS standards operating in TDD, FDD, or dual-mode operation. Additional examples of wireless communication network 100 include Worldwide Interoperability for Microwave Access (WiMax) networks, 3rd generation (3G) networks, Wi-Fi networks, and other wireless data communication networks.

Examples of UEs 111 include cellular telephones (e.g., smartphones), tablets, e-readers (e.g., e-book readers), laptops, desktops, personal computers, servers, personal digital assistants (PDAs), web appliances, set-top boxes (STBs), network routers, network switches, network bridges, parking meters, sensors, and other devices. Some devices (e.g., parking meters) among these example devices may be considered as delay tolerant devices, which may include machine-type communication (MTC) devices. An MTC device may not need user interaction to initiate communication with the network (e.g., wireless communication network 100). Some other devices (e.g., smartphones) among these example devices may be not be considered as delay tolerant devices (e.g., non-MTC devices). A non-MTC device (e.g., user equipment (UE) such as a smartphone) may need user interaction to initiate communication with the network (e.g., wireless communication network 100).

MME 101 may be a main control node for wireless communication network 100. MME 101 may communicate with eNodeB 102 to track and send messages to UEs 111. MME 101 may communicate with other UEs besides UE 111 through one or more other eNodeBs similar to, or identical to, eNodeB 102.

ENodeB 102 may operate as a serving eNodeB in a geographic area, such as cell 104 in wireless communication network 100. ENodeB 102 may be arranged (e.g., configured) to operate as an eNodeB in accordance with 3GPP-LTE standards or as a NodeB in accordance with 3GPP UMTS standards. FIG. 1 shows wireless communication network 100 including only one eNodeB (e.g., eNodeB 102) as an example. Wireless communication network 100, however, may include multiple eNodeBs (e.g., multiple eNodeBs similar to, or identical to, eNodeB 102). Each of the multiple eNodeBs may serve a particular cell in wireless communication network 100 and may or may not neighbor to eNodeB 102.

UEs 111 may be served by eNodeB 102 in cell 104. UEs 111 may be arranged (e.g., configured) to operate in accordance with 3GPP-LTE standards or other standards. FIG. 1 shows wireless communication network 100 including only two UEs (e.g., UEs 111) served by eNodeB 102 in cell 104 as an example. Wireless communication network 100, however, may include more than two UEs served by eNodeB 102. ENodeB 102 and each of UEs 111 may operate to communicate with each other using an orthogonal frequency division multiple access (OFDMA) technique.

Each of UEs 111 may operate to receive OFDMA communication signals over a multicarrier communication channel in accordance with an OFDMA technique. The OFDMA technique may be operated either in frequency domain duplexing (FDD) mode that uses different uplink and downlink spectrum or in time domain duplexing (TDD) mode that uses the same spectrum for uplink and downlink. The OFDMA communication signals may comprise orthogonal subcarriers.

With the proliferation of the number of UEs 111 in the network 100, congestion in the radio link may cause degradation in the quality of experience for current users and new users may be unable to obtain radio resources. In some current systems, access-barring mechanisms are in place for congestion control for UEs 111 in RRC IDLE, and for new users.

Embodiments herein provide congestion control mechanisms for devices in RRC CONNECTED mode. Embodiments provide methods to prevent radio access network (RAN) congestion caused by radio signaling or user traffic by allowing RAN nodes to explicitly suspend specific data radio bearers (DRB) or signaling radio bearers (SRB) while the UE 111 is in connected mode.

In some current systems operating in accordance with, for example, 3GPP TS 36.331, radio bearers (RBs) in a UE are suspended when there is a failure, for example, a mobility failure, a radio link failure or Radio Resource Control (RRC) connection reconfiguration failure, etc. Systems may use a RRC connection re-establishment procedure, after activation of access stratum (AS) security to resume these RBs. For example, current systems may use RRC connection reconfiguration subsequent to AS security activation to resume RBs. In this procedure, implemented in some current systems, all RBs are dropped and the re-establishment of the RBs may be a relatively lengthy procedure with costly signaling overhead. Further, available systems do not provide for the eNodeB 102 to suspend a specific RB during a connected mode, which would help remedy additional radio link congestion situations.

Various embodiments provide different methods for the eNodeB 102 to suspend specific RBs during a connected mode. Various embodiments may apply to non-guaranteed bit-rate (GBR) bearers for UEs 111 in a connected mode with at least one DRB established. However, embodiments are not limited thereto, and some embodiments can be applied to SRBs and GBR DRBs or any other defined dedicated radio bearers (e.g., Small Data Radio Bearers (SDRB).

In various embodiments, the eNodeB 102 will determine that a condition (e.g., congestion condition, overload condition, or other condition), exists on the network 100. Based at least partly on this determination, the eNodeB 102 will transmit a suspension notification to a UE 111 to notify the UE that an RB operating in the network 100 will be suspended. In various embodiments, the UE 111 will be in an RRC_CONNECTED state with the eNodeB 102. Processes and criteria for determining the existence of congestion conditions, and processes for notifying the UE 111 of suspensions, are discussed herein.

Some embodiments provide expanded RRC connection reconfiguration messages to suspend and resume RBs. In at least these embodiments, the eNodeB 102 will send an RRC connection reconfiguration message with a suspend notification to the UE 111. The suspend notification will include at least identification information for the RB that is to be suspended. The UE 111 will use the RRC connection reconfiguration complete message to acknowledge that the UE 111 has put the corresponding RBs into a suspended state. Same or similar messages can be exchanged between the eNodeB 102 and UE 111 to resume RBs.

Figure 2:
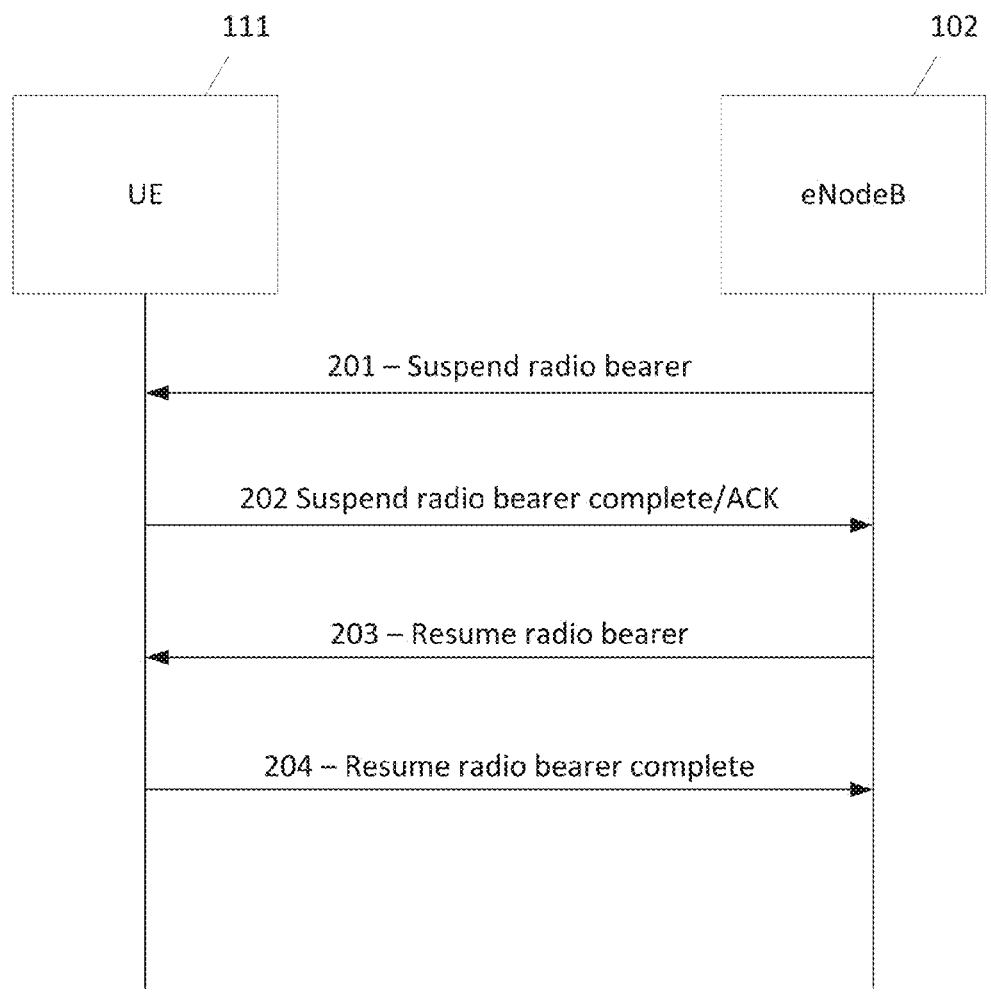
FIG. 2 shows an example communication among elements and devices in a network according to some embodiments described herein.

In some embodiments, messages other than RRC connection reconfiguration messages can be used to suspend or resume RBs. FIG. 2 shows an example communication among elements and devices in a network 100, according to some embodiments described herein. However, as will be understood by one of ordinary skill in the art, other messages and signaling, may occur.

In embodiments illustrated in FIG. 2, the eNodeB 102 transmits an RRC message 201 to the UE 111. The RRC message 201 can be, for example, a Suspend Radio Bearer message in accordance with a standard of the 3GPP family of standards for LTE, although embodiments are not limited thereto. An information element (IE) in message 201 can include an International mobile subscriber identity (IMSI) a UE 111 identifier, an Evolved Packet System (EPS) bearer identity, and an RB identity, for example, although embodiments are not limited thereto.

On receiving message 201, (e.g., a Suspend Radio Bearer message) for a corresponding RB, the UE 111 may be forbidden from initiating additional signaling on that RB. For example if UE 111 is in a connected discontinuous reception (DRX) mode, the UE 111 will not perform random access (RA) procedures or RRC reconfiguration unless or until the UE 111 receives an explicit resume notification for the RB, or an implicit notification such as an uplink grant for the RB, from the eNodeB 102.

The eNodeB 102 may also provide a back-off timer to the UE 111 that indicates that the UE shall wait for expiration of the backoff timer before requesting resources on suspended RBs, non-suspended RBs, or both suspended and non-suspended RBs. Such requests could include, for example, initiating or attempting to initiate RA or RRC reconfiguration for suspended or non-suspended RBs. The eNodeB 102 may set the backoff timer to a value that may allow a congestion situation to stabilize. The backoff timer may be a parameter that the eNodeB 102 sends to the UE 111 when the suspend indication is sent to the UE 111.

The decision to suspend some RBs may be implementation-dependent. In some embodiments, network triggers and mechanisms or other criteria (e.g., including QoS characteristics of the RBs) can define when and how to suspend certain RBs. Some mechanisms can include decisions based on RB congestion information stored at the eNodeB 102 or otherwise accessible by the eNodeB 102.

In some embodiments, the eNodeB 102 can receive a suspend indication from core network elements (e.g. MME, access network discover and select function (ANDSF), policy and charging rules function (PCRF), etc.). For example the eNodeB 102 may notify the MME 101 of a congestion condition and the MME 101 can decide which RBs to suspend based on, for example, UE 111 subscription information.

Network 100 operators or operations and maintenance functions (O&M) implemented by network operators may determine to suspend RBs due to an undesired UE 111 behavior, traffic types, or other UE-specific behavior transmitted on an RB. Network 100 operators or O&M functions may suspend RBs to control overload situations.

The eNodeB 102 or other network element may consider which, if any, RBs used by UE 111 are suspended before releasing the UE 111 RRC connection (e.g., passing the UE 111 to RRC Idle). For example, if the eNodeB 102 determines that a suspended RB is the only RB that was active in the UE 111, then the RRC inactivity timer on the eNodeB 102, which is used for releasing the RRC connection, should be set or responded to such that the UE 111 connection may not be released due to inactivity. Thus, in some embodiments, this inactivity timer may be adjusted based on the congestion state of the network and the RRC connection release might be delayed or preponed accordingly.

An example for an information element (IE) used to suspend DRBs is shown in Table 1. The example IE can be called DRB-ToAddModSuspend although embodiments are not limited thereto. The example IE of Table 1 may include additional fields, for example suspend-backoff-timer, to that implemented in IE DRB-ToAddMod of 3GPP TS 36.331:

TABLE 1

Radioresourceconfigdedicated IE from TS 36.331.

```
DRB-ToAddModSuspend ::= SEQUENCE {
    eps-BearerIdentity  INTEGER (0...15)    OPTIONAL,           --Cond DRB-Setup
    drb-Identity        DRB-Identity,
    pdcp-Config         PDCP-Config         OPTIONAL,           --Cond PDCP
    rlc-Config          RLC-Config          OPTIONAL,           --Cond Setup
    logicalChannelIdentity                  INTEGER (3..10) OPTIONAL,  --Cond DRB-Setup
    logicalChannelConfig                    LogicalChannelConfig OPTIONAL,  --Cond Setup
    suspend-backoff-timer                   ENUMERATED{ms100, ms200, ms300, ms400, ms600,
ms1000, ms1500, ms2000...},                 OPTIONAL
    ...
}
```

In message 202, the UE 111 will transmit an acknowledgement to acknowledge receipt of the suspension notification. Message 202 can include acknowledgement that the UE 111 has put the corresponding RBs in a suspended state. The acknowledgement may include identification information of the corresponding RB.

After a congestion condition has past, or a timer has expired, etc., in message 203 the eNodeB 102 can inform the UE 111 that the UE 111 can resume operations on the corresponding RB. Message 203 can be, for example, a Resume Radio Bearer message in accordance with a standard of the 3GPP LTE family of standards although embodiments are not limited thereto.

In message 204, the UE 111 will transmit an acknowledgement to acknowledge receipt of the resume notification. The message 204 can include acknowledgement that the UE 111 has resumed use or may later resume use of corresponding RBs that were previously in a suspended state.

In accordance with some embodiments, the UE 111 may buffer UE 111 uplink data intended for suspended RBs, while in the downlink, the eNodeB 102 may buffer data until the corresponding RB is resumed. The eNodeB 102 in some embodiments may initiate suspend/resume procedures, at least somewhat similar to suspend/resume procedures described herein, in the CN by informing the MME 101 about decisions to suspend or resume RBs. In some embodiments, the PDCP discard timer may be modified if an RB is suspended. In some embodiments, the UE 111 may discard a PDCP service data unit (SDU) upon expiration of a corresponding timer.

In some embodiments, upper layers may receive an indication of suspension and resuming activities as described herein in order that implementations of these layers can account for network congestion and lack of radio resources.

In some current systems, the network 100 can perform congestion control on the control plane on a per-access point name (APN) basis in accordance with, for example, 3GPP TS 24.301. The network 100 can reject any new requests for connection towards that APN which is congested.

Some embodiments provide that network 100 can suspend certain RBs allocated to an APN to admit UEs 111 that have higher priority, based on for example UE 111 subscriptions or type of connection (e.g., delay tolerant versus non-delay tolerant). In these embodiments, the network 100 can suspend certain RBs based on the APN congestion indication. In accordance with some embodiments, therefore, congestion control can involve suspending user plane resources without releasing the UE 111 network connection and thereby avoiding expensive signaling overhead due to connection establishment. Congestion control in accordance with some embodiments can include control plane functionality that allows new requests to be admitted.

Because current systems may implement congestion control in the MME, embodiments provide notifications from the MME to, for example, an eNodeB 102 or radio network controller (RNC), to inform the eNodeB that RBs are to be suspended. The eNodeB 102 can decide which RBs to suspend based on information provided by the MME 101. The MME information may take into account UE 111 subscription information into consideration when deciding to suspend RBs. The eNodeB 102 may transmit an acknowledgement message to acknowledge the messages or other information received from the MME 101 regarding suspension of RBs.

While in congestion the eNodeB 102 may dynamically suspend and resume different RBs from different UEs 111. The algorithm used for such decisions might be operator or implementation specific. Some embodiments may allow for a network 100 operator to manage the resources in a more dynamic way, which may be useful when different RBs are bundled in the same EPS bearer.

Figure 3:
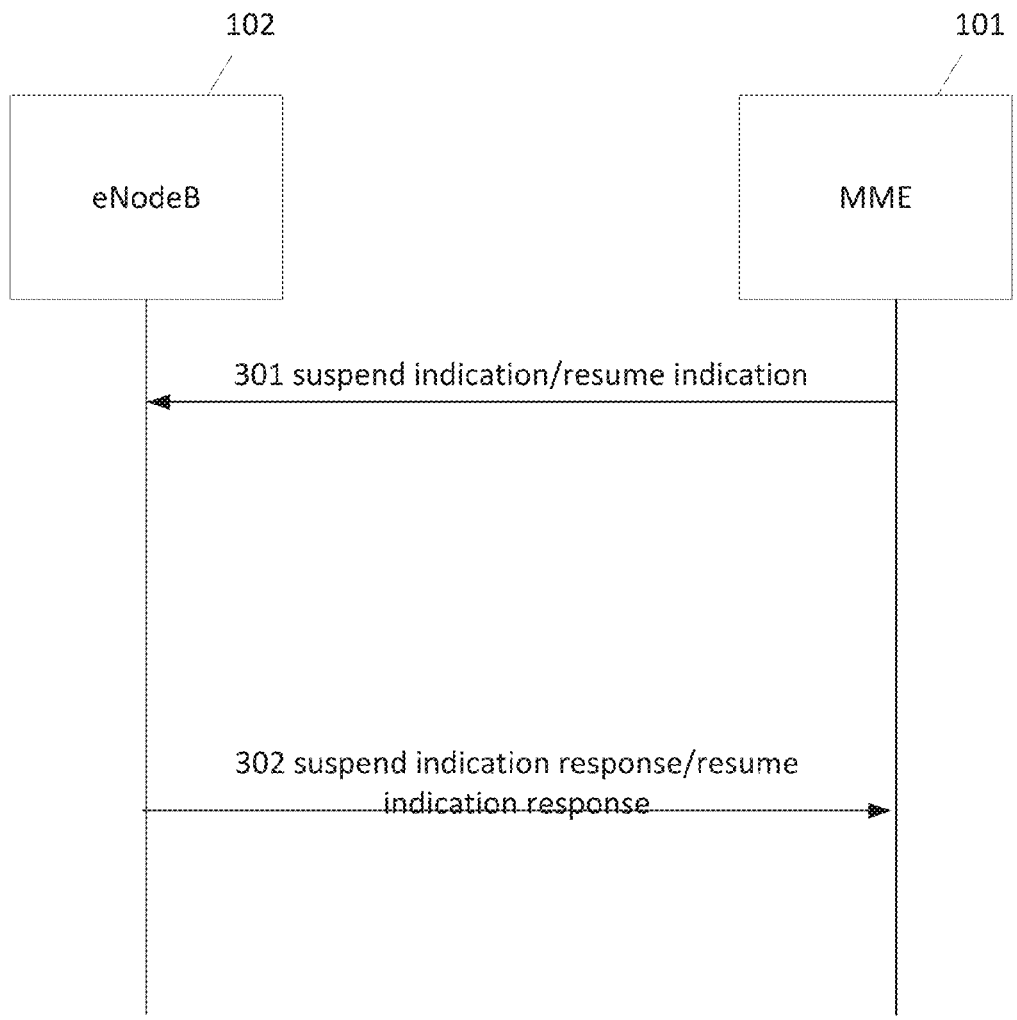
FIG. 3 shows an additional example communication among elements and devices in a network according to some embodiments described herein.

Some embodiments add messages 301 and 302 to the S1 interface (S1-AP) as shown in the FIG. 3 below, or some embodiments can enhance existing OVERLOAD START and OVERLOAD STOP messages to carry RB suspension information as described herein.

Once the APN congestion is managed, the MME 101 notifies the eNodeB 102. The eNodeB 102 may also provide congestion notification to the MME 101 in a RAN overload situation. The MME 101 may use such information for initiating suspension indications.

Figure 4:
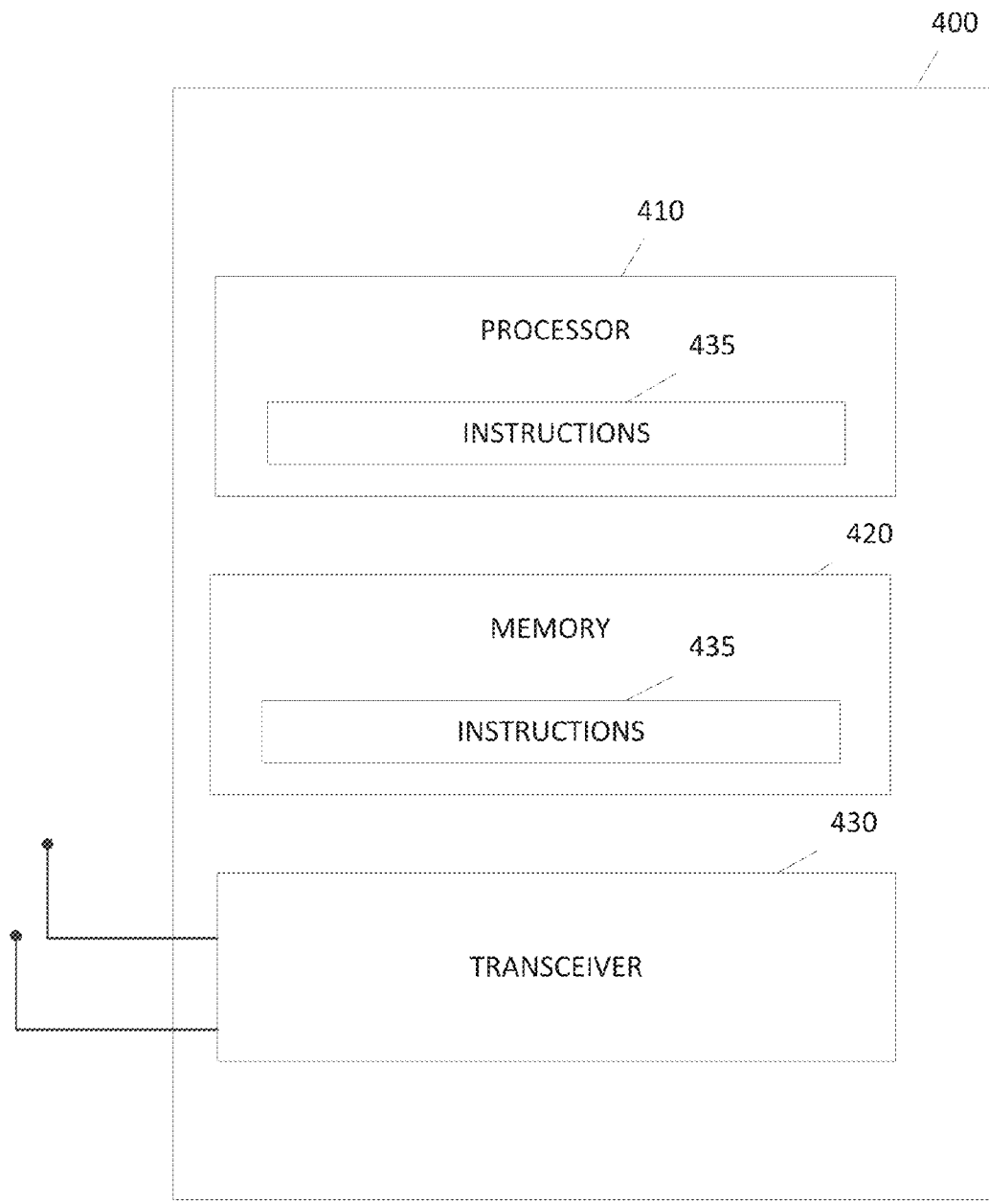
FIG. 4 is a block diagram showing details of an eNodeB according to some embodiments described herein.

FIG. 4 is a block diagram showing details of an eNodeB 400 according to some embodiments. The eNodeB 400 may be suitable as eNodeB 102 (FIG. 1). While some embodiments are described with respect to an eNodeB that operates in accordance with 3GPP LTE, other embodiments can include similar circuitry for implementing functions of a NodeB in accordance with a 3GPP UMTS standard. The eNodeB 400 includes a processor 410, a memory 420, a transceiver 430, and instructions 435. The eNodeB 400 may include other elements (not shown).

The processor 410 comprises one or more central processing units (CPUs), graphics processing units (GPUs), or both. The processor 410 provides processing and control functionalities for the eNodeB 400. Memory 420 comprises one or more transient and static memory units configured to store instructions 435 and data for the eNodeB 400.

The transceiver 430 comprises one or more transceivers including a multiple-input and multiple-output (MIMO) antenna to support MIMO communications. The transceiver 430 receives UL transmissions and transmits DL transmissions, among other things, from and to UE 111 (FIG. 1).

The processor 410 can determine that a congestion condition exists on the network. The processor 410 can determine existence of a congestion indication based on criteria or algorithms described herein. For example, the processor 410 can determine that the congestion condition exists based on RB congestion information maintained by the eNodeB 400. In some embodiments, the processor 410 can determine that a congestion condition exists based on congestion information received from MME 101 for an APN.

The transceiver 430 can transmit a suspension notification to the UE 111 (wherein the UE 111 is in an RRC_CONNECTED state with the eNodeB 400), to notify the UE 111 that a RB operating in the network 100 (FIG. 1) will be suspended. The suspension notification may be transmitted in a Radio Resource Control (RRC) reconfiguration message, or the suspension notification can be transmitted in a RRC Suspend Radio Bearer message in accordance with a standard of 3GPP family of standards for LTE, although embodiments are not limited thereto. The RRC Suspend Radio Bearer message may include a backoff timer as described herein to indicate a time duration for which the UE 111 shall wait before requesting resources on the corresponding RB. The processor 410 can modify a PDCP discard timer based on the value of the backoff timer.

The transceiver 430 can transmit a resume notification, at a point subsequent to transmitting the suspension notification, to notify the UE 111 that the corresponding RB is available for use. The transceiver 430 can receive an acknowledgement message from the UE 111, in response to notifying the UE 111 that at least one RB will be unavailable or that an RB has been resumed. The acknowledgement will include identification information of the corresponding RB.

The instructions 435 comprise one or more sets of instructions or software executed on a computing device (or machine) to cause such computing device (or machine) to perform any of the methodologies discussed herein. The instructions 435 (also referred to as computer- or machine-executable instructions) may reside, completely or at least partially, within the processor 410 and/or the memory 420 during execution thereof by the eNodeB 400. The processor 410 and memory 420 also comprise machine-readable media.

Figure 5:
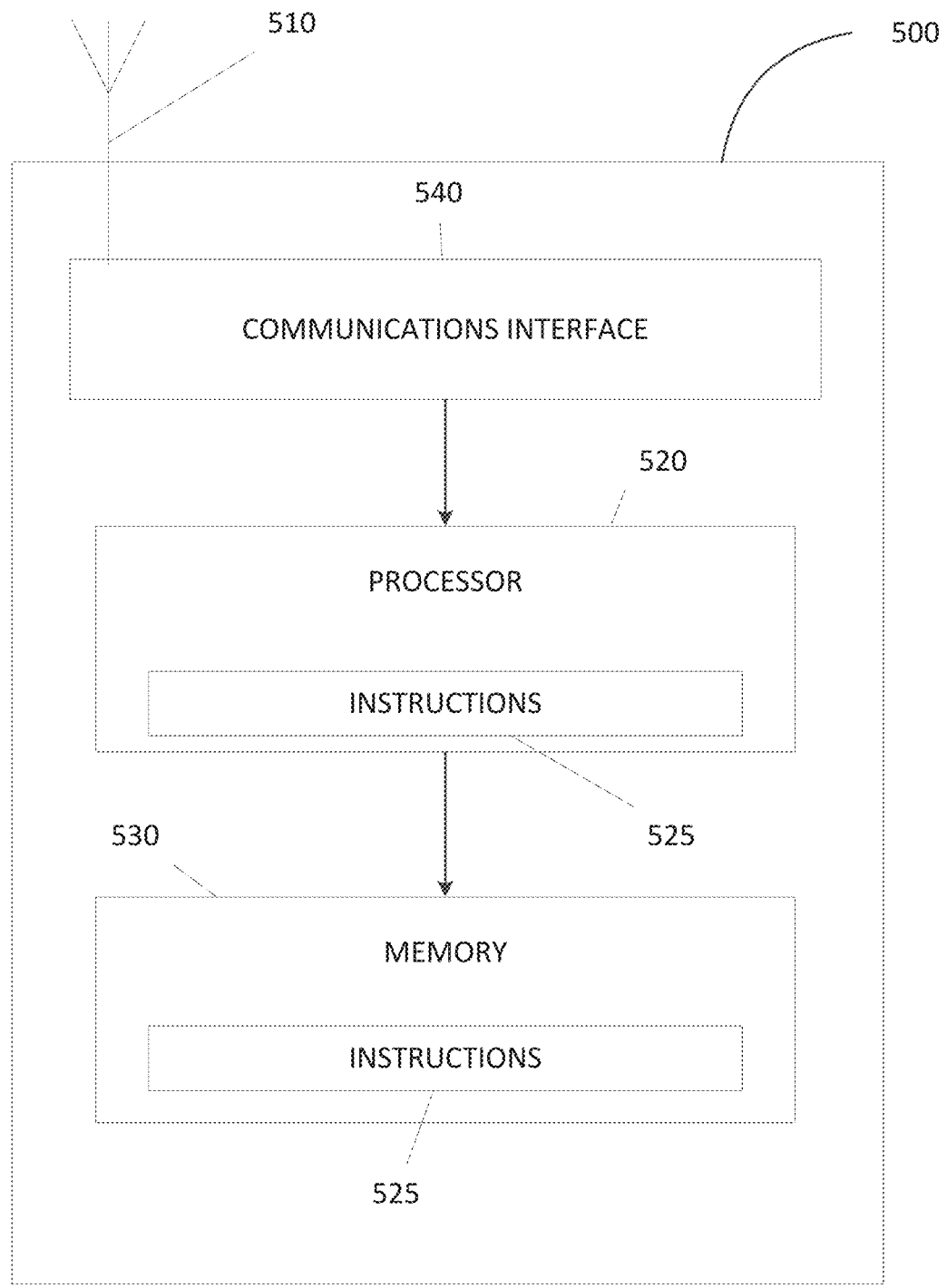
FIG. 5 shows an example block diagram of a user equipment (UE), according to some embodiments described herein.

FIG. 5 is a block diagram of the basic components of a UE 500 in accordance with some embodiments. The UE 500 may be suitable as a UE 111 (FIG. 1). The UE 500 may support methods for congestion control as described herein regarding FIG. 1-4.

The UE 500 includes one or more antennas 510 arranged to communicate with a NodeB, an eNodeB 102 (FIG. 1), or other types of wireless local area network (WLAN) access points. The UE 500 further includes a processor 520, instructions 525, and a memory 530. The UE 500 may further include a communications interface 540. In one embodiment, the memory 530 includes, but is not limited to, random access memory (RAM), dynamic RAM (DRAM), static RAM (SRAM), synchronous DRAM (SDRAM), double data rate (DDR) SDRAM (DDR-SDRAM), or any device capable of supporting high-speed buffering of data.

Example embodiments allow a UE 500 to enter an RRC CONNECTED state with the network 100. Example embodiments allow the UE 500 to receive, using the communications interface 540 and while the UE is in an RRC_CONNECTED state, a suspension notification indicating that an RB operating in the network 100 has been suspended.

Example embodiments allow the UE 500 to transmit, using the communications interface 540, an acknowledgement of the suspension notification. Using the communications interface 540, the UE 500 can receive a value for a backoff timer indicating a time duration for which the UE 500 shall not request resources. The UE 500 will then refrain from transmitting on the RB for at least the time duration.

The processor 520 may include logic or code to enable the UE 500 to process signals received from the network through the antenna 510. The processor 520 may include code or other instructions 525 to allow the UE 500 to buffer data for uplink transmission in the memory 530 for at least the time duration. The processor 520 can arrange to transmit at least this buffered data upon expiration of the backoff timer, or the processor 520 can discard the buffer data upon expiration of the backoff timer. However, embodiments are not limited to these two actions regarding buffered data.

As those of ordinary skill in the art will readily appreciate, various aspects described throughout this disclosure may be extended to other telecommunication systems, network architectures and communication standards. By way of non-limiting example, various aspects may be extended to other Universal Mobile Telecommunications System (UMTS) systems. Various aspects can be used in systems employing Long Term Evolution (LTE) (in FDD, TDD, or both modes), and LTE-Advanced (LTE-A) (in FDD, TDD, or both modes).

Examples, as described herein, may include, or may operate on, logic or a number of components, components, or mechanisms. Components are tangible entities capable of performing specified operations and may be configured or arranged in a certain manner. In an example, circuits may be arranged (e.g. internally or with respect to external entities such as other circuits) in a specified manner as a component. In an example, the whole or part of one or more computer systems (e.g. a standalone, client or server computer system) or one or more hardware processors may be configured by firmware or software (e.g. instructions, an application portion, or an application) as a component that operates to perform specified operations. In an example, the software may reside (1) on a non-transitory machine-readable medium or (2) in a transmission signal. In an example, the software, when executed by the underlying hardware of the component, causes the hardware to perform the specified operations.

Accordingly, the terms "component" and "component" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which components are temporarily configured, one instantiation of a component may not exist simultaneously with another instantiation of the same or different component. For example, where the components comprise a general-purpose hardware processor configured using software, the general-purpose hardware processor may be configured as respective different components at different times. Accordingly, software may configure a hardware processor, for example, to constitute a particular component at one instance of time and to constitute a different component at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those of ordinary skill in the art to practice them. Other embodiments may incorporate structural, logical, electrical, process, and other changes. Portions and features of some embodiments may be included in, or substituted for, those of other embodiments.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method, performed by an evolved NodeB (eNodeB), for congestion control in a network, the method comprising:
   determining that a congestion condition exists on the network; and
   transmitting a suspension notification to a user equipment (UE), the UE being in an RRC_CONNECTED state with the eNodeB, to notify the UE that a radio bearer (RB) operating in the network will be suspended, upon determining that the congestion condition exists, wherein the suspension notification is transmitted in a radio resource control (RRC) Suspend Radio Bearer message including a backoff timer to indicate a time duration for which the UE shall wait before requesting resources on the corresponding RB, and wherein a packet data convergence protocol (PDCP) discard timer has been modified based on a value of the backoff timer.

2. The method of claim 1, wherein the suspension notification is transmitted in a Radio Resource Control (RRC) reconfiguration message.

3. The method of claim 1, wherein the suspension notification is transmitted in the radio resource control (RRC) Suspend Radio Bearer message in accordance with a standard of the 3rd Generation Partnership Project (3GPP) family of standards for long-term evolution (LTE).

4. The method of claim 1, further comprising:
   transmitting a resume notification, at a point subsequent to transmitting the suspension notification, to notify the UE that the corresponding RB is available for use.

5. The method of claim 1, further comprising:
   receiving an acknowledgement message from the UE, in response to notifying the UE that at least one RB will be unavailable, the acknowledgement including identification information of the corresponding RB.

6. The method of claim 1, wherein the eNodeB determines that the congestion condition exists based on RB congestion information maintained by the eNodeB.

7. The method of claim 6, wherein the eNodeB determines that the congestion condition exists based on congestion information received from a mobility management entity (MME) for an access point name (APN).

8. A user equipment (UE) for operating in a wireless communication network, the UE comprising:
   physical layer circuitry arranged to
      enter an RRC_CONNECTED state with the wireless communication network;
      receive a suspension notification from the wireless communication network, while the UE is in an RRC_CONNECTED state, that a radio bearer (RB) operating in the wireless communication network has been suspended, wherein the suspension notification is received in a radio resource control (RRC) Suspend Radio Bearer message including a backoff timer to indicate a time duration for which the UE shall wait before requesting resources on the corresponding RB, and wherein a packet data convergence protocol (PDCP) discard timer has been modified based on a value of the backoff timer; and
      transmit an acknowledgement of the suspension notification.

9. The UE of claim 8, wherein the physical layer circuitry is further configured to:
   receive the value for the backoff timer indicating the time duration for which the UE shall not request resources on the RB; and
   refrain from transmitting on the RB for at least the time duration.

10. The UE of claim 9, further comprising a memory and processing circuitry, and wherein the processing circuitry is arranged to buffer data for uplink transmission in the memory for at least the time duration.

11. The UE of claim 10, wherein the processing circuitry is arranged to transmit the buffer data upon expiration of the backoff timer.

12. The UE of claim 10, wherein the processing circuitry is arranged to discard the buffer data upon expiration of the backoff timer.

13. An evolved NodeB (eNodeB) operating in a network, the eNodeB comprising:
   processing circuitry arranged to determine that usage of a radio bearer (RB) operating in the network should be suspended, based on congestion information related to the RB; and
   a transceiver arranged to
      transmit a suspension notification, upon determining that usage of the RB should be suspended, to notify a user equipment (UE) that is in an RRC_CONNECTED state with the eNodeB that the RB will be suspended, wherein the suspension notification is transmitted in a radio resource control (RRC) Suspend Radio Bearer message including a backoff timer to indicate a time duration for which the UE shall wait before requesting resources on the corresponding RB, and wherein a packet data convergence protocol (PDCP) discard timer has been modified based on a value of the backoff timer.

14. The eNodeB of claim 13, wherein the physical layer circuitry is further arranged to transmit the suspension notification in a radio resource control (RRC) reconfiguration message or in an RRC Suspend Radio Bearer message in accordance with a standard of the 3rd Generation Partnership Project 3GPP) family of standards for long-term evolution (LTE).

15. A method, performed by a user equipment (UE) for operating in a wireless communicating network, the method comprising:
   entering into an RRC_CONNECTED state with the wireless communicating network;
   receiving a suspension notification from the wireless communicating network, while the UE is in an RRC_CONNECTED state, that a radio bearer (RB) has been suspended from use, wherein the suspension notification is received in a radio resource control (RRC) Suspend Radio Bearer message including a backoff timer to indicate a time duration for which the UE shall wait before requesting resources on the corresponding RB, and wherein a packet data convergence protocol (PDCP) discard timer has been modified based on a value of the backoff timer; and
   transmitting an acknowledgement of the suspension notification; and
   refraining from operating on the RB for at least a time duration specified in the suspension notification.

16. The method of claim 15, further comprising:
   buffering data in a memory for the time duration; and
   transmitting the data upon receiving a resume notification indicating that the RB is available for use.

* * * * *